July 21, 1959  F. HARDERS  2,895,820
METHODS OF REDUCING IRON ORES AND CARBURIZING UNDER VACUUM
Filed Oct. 29, 1957
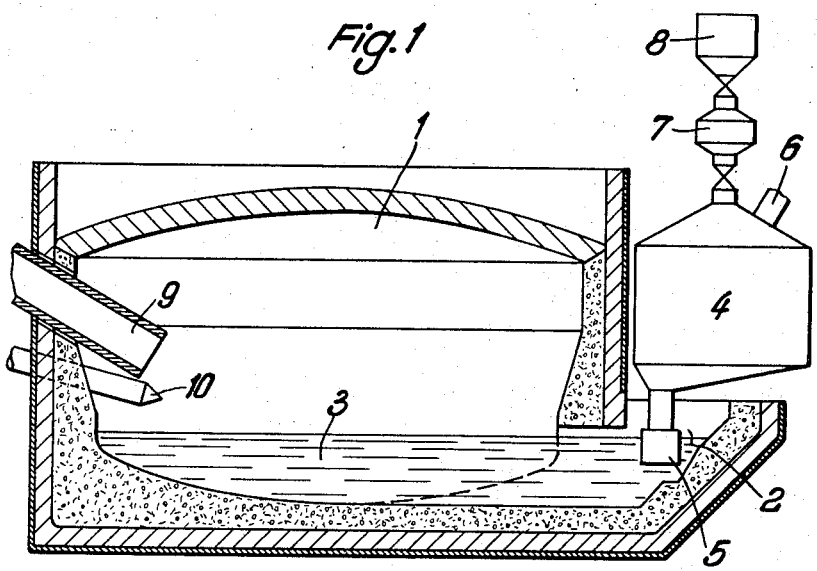
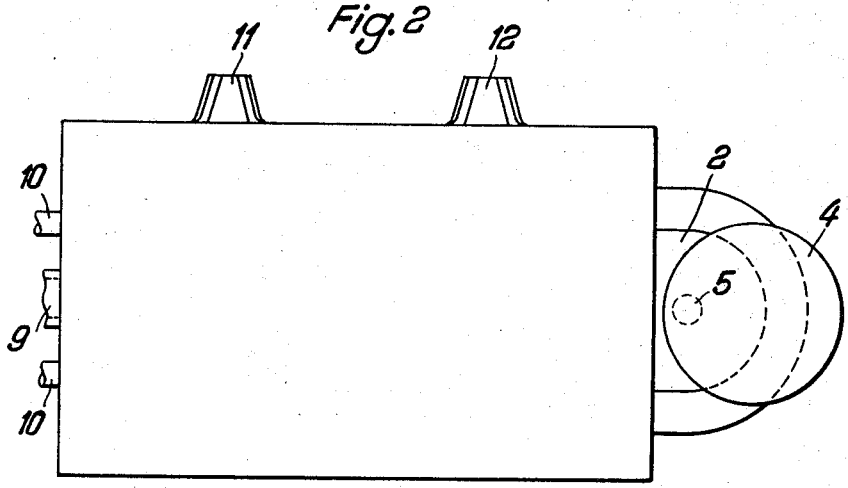
Inventor:
FRITZ HARDERS
BY Thomas, Meierman & Russell
ATTORNEYS

United States Patent Office 2,895,820
Patented July 21, 1959

2,895,820

METHODS OF REDUCING IRON ORES AND CARBURIZING UNDER VACUUM

Fritz Harders, Post Ergste uber Schwerte (Ruhr), Germany, assignor to Dortmund-Hörder Hüttenunion Aktiengesellschaft, Dortmund, Germany Application October 29, 1957, Serial No. 693,184

Claims priority, application Germany November 8, 1956

6 Claims. (Cl. 75—48)

When refining pig iron by the pig iron-iron ore process, the process includes the reduction of the iron ore, by which a corresponding quantity of iron is supplied to the metal melt. Repeated attempts have been made to make use of this fact for the direct production of iron from ores. Such a process is, however, only economical if the carbon consumed in the reduction of the ores in the liquid iron melt can be continuously replaced in the necessary quantities.

In a known process for manufacturing iron and steel directly from ores and additional substances, e.g. fluxes, the carbon used as reducing agent is supplied to the iron melt, which is heated, for example, electrically, by adjustable carbon members similar to electrodes which dip into the melt, and the reduced iron and the slag are continuously or periodically tapped. Alternative suggestions have been made, which comprise pressing the carbon in the form of coal or liquid or gaseous hydrocarbons into the iron melt in which the reaction takes place. By this process, not only pig iron can be produced but steel can also be made directly by interrupting the supply of carbon to the iron melt and then refining the latter as in the pig iron-iron ore process.

The subject of the present invention is an exceedingly simple, economical and efficient process for introducing carbon into an iron melt which is used for the reduction of iron ores in the liquid phase. The process consists in that the iron melt which effects the reduction is sucked in portions into a vessel which can be evacuated, is carburised there, and then returned to the melt. The sucking in of the liquid iron and the return of the carburised iron to the melt which performs the reduction can be done by periodically raising and lowering the vessel which is under a constant vacuum and provided at the bottom with a tubular outlet which dips into the melt, so that pressure changes take place in the desired manner. Alternatively, the melt can be sucked in under vacuum, carburised, and then discharged by altering the pressure in the vacuum vessel, i.e. by flooding it with gas.

In addition to the operational simplicity of this carburising process, it is of particular advantage to the course of the reduction process owing to the fact that solution of the carbon in the iron takes place extremely rapidly in vacuo, while the periodic sucking off and pumping back of the melt results in a very vigorous agitation of the bath, which is absolutely essential if the iron ore reduction is to take place economically.

The process according to the invention will be further explained by way of example with reference to the drawings, in which Fig. 1 is a vertical section through a reducing furnace;
Fig. 2 is a plan view of this furnace.

Referring to the drawings, the open hearth furnace 1, which is equipped with a fore-hearth 2, is filled with a bath of pig iron 3 which is either charged in liquid form into the furnace or melted there from solid pig iron. In the region of the fore-hearth 2, there is a vacuum vessel 4, of which the tubular outlet 5 from the bottom dips so far into the melt in the fore-hearth that a pressure seal is produced. The vacuum in the vessel 4 is produced by a pump, not shown, which is connected to a connecting member 6 of the vessel 4. A charging device 7, 8 for the carburising agent opens through a valve-like inlet into the vacuum vessel.

The ores to be reduced are introduced into the furnace through a pipe 9, which is suitably rotated and which, in the example illustrated, projects through an end face of the furnace. The numeral 10 indicates a burner which supplies the heat necessary for reducing the ore. On the long side of the furnace, there is a tap hole 11 for the iron and a tap hole 12 for the slag. Naturally, the ores to be reduced can also be supplied to the furnace by other means than that illustrated; they can either be mixed with the necessary additions which form the slag, or added separately. The heating of the furnace can be effected with solid or gaseous fuels, or also electrically.

In the furnace described, the process according to the invention takes place as follows:

After the liquid pig iron, with a carbon content of approximately 4 to 4.5%, has been introduced into the furnace, the addition of the ore to be reduced, which is mainly in powder or granular form and may consist, for example, of known concentrates, slimes, and also burnt pyrites, is begun. Together with the ores, the fluxes are also introduced and mixed in such a way that a sufficiently liquid slag is produced on the carbon-containing molten iron during the reduction. The quantity of the slag depends on the purity of the ore used, so that it may be quite small in the case of high quality ores.

Since the ores are reduced when charged to the carbon-containing melt and the carbon in solution is thereby consumed, the carbon necessary for reduction must constantly be supplied to the melt. This takes place, in accordance with the invention, by sucking the melt in portions into the vacuum vessel 4, carburising it there, and then returning it to the melt. Since the carburising takes place extraordinarily rapidly in vacuo, the efficiency of the process is very high. The vigorous agitation of the bath produced by the alternate sucking out and pumping in of the reduced melt is of outstanding significance in this connection.

For this reason, the reduction of iron ores by the process of the invention can also be carried out in furnaces other than open hearth furnaces, e.g. in shaft furnaces with relatively great depth of bath and charges of heavy weight.

As in all reductions of iron ores by carbon in solution, the liberated carbon monoxide can also be used in the process of the invention for heating the free furnace chamber. It can also be used for pre-heating and preliminary reduction of fine ores, for example, by removing partially combusted gas through the rotating supply pipe 9 in counterflow to the stream of the ore.

As in the known processes for reducing ores with carbon the process of the invention is also suitable for the direct production of steel. The method of carburising used affords quite special advantages.

When producing steel directly from iron ores by means of carbon in solution the carbon supply is periodically interrupted while the supply of ore remains unchanged. A refining of the carbon-containing iron then takes place as in the pig iron-iron ore process.

For making steel, it is proposed, according to the invention, to suck the iron portion by portion into the vacuum vessel also during this refining process and then to return it to the melt after evacuation. In this way, the vacuum apparatus serves as a stirring device for producing vigorous movement of the liquid metal. The refining may be carried out not only by means of ores but also by blowing oxygen on to or into the melt. Owing to the continuous vacuum treatment, the oxygen content of the melt is kept at a level which is far below that usually occurring in refining processes, so long as there is sufficient carbon available for the carbon monoxide reaction. The melt then acts reducingly on the slag which is consequently very poor in iron at the end of the refining process. If the carbon content of the melt has been lowered to such an extent at the end of the refining process that it no longer suffices for the stoichiometric reaction with the oxygen of the bath, then the removal of further quantities of oxygen can be effected by corresponding quantities of carbon which are introduced into the vacuum vessel. In vacuo, the steel can be carburised to any desired final content of carbon, its composition can be corrected by means of ore, and its quality can be to a large extent influenced by deoxidation, denitriding etc.

In the example illustrated, only one vacuum vessel is connected to the reduction and treatment furnace for carburising and treating the melt. Several such vessels can also be used and the vessels can be in communication with the melt or the furnace in another manner than through the fore-hearth, for example by disposing the vessel or vessels above the furnace and leading their suction and outlet pipes directly through the heating chamber of the furnace.

I claim:

1. The process of reducing iron ore, which comprises delivering the ore and additional materials to an iron melt, sucking the iron melt in portions into an evacuated vessel, carburizing the melt in the vessel and returning the carburized portions to the iron melt.

2. The process of reducing iron ore, which comprises continuously delivering the ore and flux to a highly carburized iron melt and replacing the carbon as it is consumed in the reduction of the ore by sucking iron melt in portions into an evacuated vessel, carburizing the sucked up portion in the vessel and returning the carburized portions to the melt.

3. A method as claimed in claim 1, in which the evacuated vessel has an outlet and inlet which dips into the iron melt and the portions of the melt are sucked up into the vessel and returned to the melt by lowering and raising the vessel.

4. A process for the production of steel from iron ore, which comprises delivering the ore and additional materials to an iron melt, sucking the melt in portions into an evacuated vessel, carburizing the melt in the vessel, returning the carburized portion to the melt, and, when a sufficient quantity of iron has been produced, continuing the process of sucking up portions into the vessel and returning them to the melt, but without carburizing the portions and continuing the delivery of ore until the melt has been refined to steel.

5. A process for the production of steel from iron ore, which comprises delivering the ore and flux to an iron melt, sucking the iron melt in portions into an evacuated vessel, carburizing the melt in the vessel, returning the carburized portions to the melt, and, when a sufficient quantity of ore has been reduced, continuing the process of sucking up portions of the melt into the vessel and returning them to the melt but without carburizing the portions and continuing the delivery of ore until the melt has been refined to steel.

6. A process as claimed in claim 5, in which the melt is treated in the vacuum vessel with carbon, ore and agents which deoxidize and denitride the melt.

References Cited in the file of this patent

UNITED STATES PATENTS

| | | |
|---|---|---|
| 1,921,060 | Williams | Aug. 8, 1933 |
| 2,054,923 | Betterton et al. | Sept. 22, 1936 |